United States Patent Office 3,611,583
Patented Oct. 12, 1971

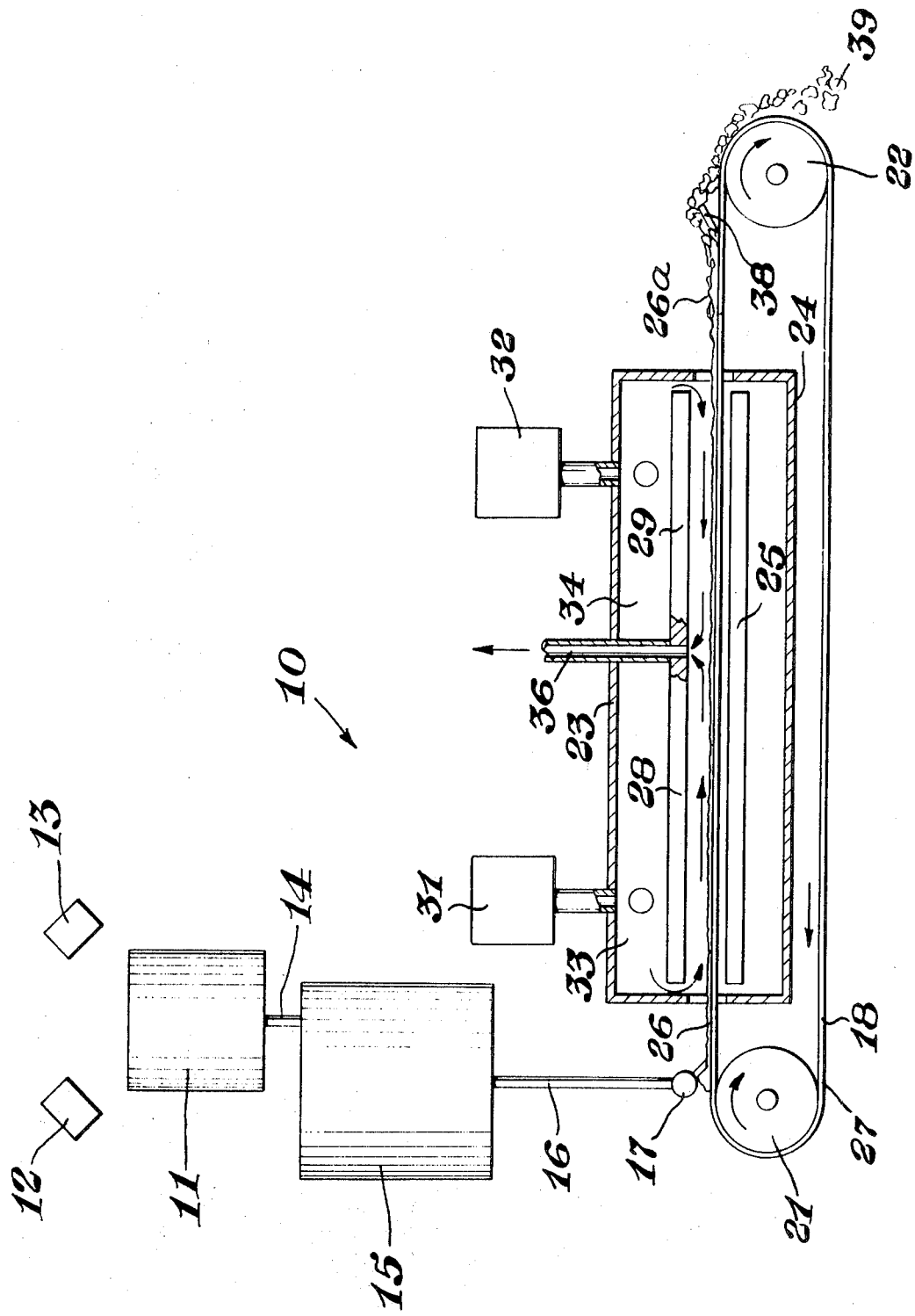

3,611,583
METHOD FOR EXPANDING AND DRYING
EXPANDABLE MICROSPHERES
Thomas F. Anderson, Midland, Glen L. Gunderman,
Clare, and Harold A. Walters, Beaverton, Mich., assignors to The Dow Chemical Company, Midland,
Mich.
Filed May 28, 1970, Ser. No. 41,226
Int. Cl. F26b *3/00*
U.S. Cl. 34—9
9 Claims

ABSTRACT OF THE DISCLOSURE

Expandable microspheres are expanded and dried by formulating with a water dispersible flocculant, spreading the slurry in a thin layer on a heated belt and drying the layer with the aid of hot air.

---

Expandable microspheres are small generally spherical particles having a polymeric shell and a central core of a liquid blowing agent generally symmetrically encapsulated therein. On heating, the particles expand to form a gas-filled monocellular sphere. Such microspheres are disclosed in British Pat. 1,044,680; Canadian Pat. 752,451 and U.S. Pats. 3,479,811 and 3,293,114. The unexpanded microspheres often have diameters of from about 3 to 10 microns, and when expanded as individual particles, form a product which might be considered to be more or less equivalent to a heavy smoke. One volume of expanded individual microspheres contained in a glass bottle having 10 or 15 volumes may be shaken or disturbed and when shaking has ceased, a considerable proportion of the microspheres are still suspended in the air and very slowly settle to the bottom of the bottle. Such expandable microspheres, for many applications where foaming or expanding of the individual microspheres is accomplished, are contained in a matrix such as a plastic film or an oil or other material and dust is not a significant problem. However, essentially dry expanded microspheres are required for the preparation of syntactic foams wherein it is desired to expand the microsphere prior to incorporating it in a curing matrix such as a polyester or epoxy resin. Substantial difficulty has been encountered in preparing and handling expanded microspheres because of their extremely small size and low density. Generally, conditions which result in optimum expansion of the microspheres gives rise to the greatest dusting problems, whereas more or less dust-free expanding techniques often result in less than a desirable degree of expansion.

It would be desirable if there were available an improved method for the expanding and drying of synthetic resinous microspheres which was relatively dust-free and resulted in a desirable degree of expansion of the microspheres.

Further, it would be advantageous if there were available an improved method for the preparation of expanded synthetic resinous microspheres which was continuous and had a relatively small inventory.

These benefits and other advantages in accordance with the method of the present invention are achieved in a process for drying and expanding synthetic resinous expandable microspheres, the steps of the method comprising preparing a dispersion of a mass of unexpanded synthetic resinous thermoplastic microspheres in a liquid which is a non-solvent for the resin of the microspheres, the dispersion containing from about 0.5 to about 20 weight percent (based on the weight of dry microspheres) and beneficially from 1 to 10 percent by weight of a flocculating agent for the dry expanded microspheres, depositing the resultant dispersion in the form of a thin exposed layer on a moving surface, heating the surface from a location remote from the microspheres and generally adjacent to the surface, contacting the exposed layer of microsphere dispersion with a stream of gas to thereby remove the moisture therefrom and to generally complete expansion and drying, subsequently removing the dried microspheres from the surface in the form of a dry particulate mass of flocculated expanded microspheres.

Further features and advantages of the present invention will become more apparent from the following specification when taken in connection with the drawing wherein the figure schematically depicts the method of the invention employing an apparatus generally designated by the reference numeral 10. The apparatus 10 comprises in cooperative combination an agitated vessel 11, a source of expanded wet microspheres 12, a source of additives 13. The wet or dry unexpanded microspheres and additives are added to a dispersing medium held in the tank. Generally, a suitable dispersing agent is water. The tank 11 has a discharge 14 supplying a head box or supply tank 15. The supply tank 15 has a discharge conduit 16 which terminates remote from the head box 15 and a dispensing nozzle 17. The dispensing nozzle 17 is adapted to spread the dispersion from the tank 15 on the surface of an endless belt 18. The belt 18 is a broad-surfaced conveyor supported and driven by drums 21 and 22. The belt 18 passes into a heating and drying oven 23. The oven 23 has an enclosure 24. Disposed within the enclosure 24 is a first or belt back heater 25 adapted to heat a surface of the belt 18 which is remote or oppositely disposed from a microsphere layer 26 on an outer surface 27 of the belt 18. A first baffle 28 is disposed adjacent the microsphere dispersion layer 26 and remote from the belt heater 25. The baffle 28 is disposed generally adjacent the feed nozzle 17 and remote from the drum 22. A second baffle 29 is disposed adjacent the surface 27 of the belt 18 and generally remote from the feed nozzle 17. A first hot air supply means 31 is disposed adjacent the feed end of the belt 18. A second hot air supply 32 is disposed adjacent the discharge of the belt 18. The oven 24 defines a first plenum 33 in operative communication with the heater 31. The plenum 33 receives hot gas from the heater 31 and causes it to flow concurrently with the motion of the belt, whereas the heater 32 provides air to the plenum 34 which discharges adjacent the discharge end of the belt and provides a stream of air moving toward the feed end of the belt, thereby providing a countercurrent stream of discharged air. A vent 36 in combination with an exhaust fan or blower (not shown) is disposed generally centrally within the oven from which a major portion of the air supplied by the heaters 31 and 32 is removed therefrom. The velocity of the drying gas such as air, of course, should not be sufficiently great to entrain the flocculated microspheres. Adjacent the discharge end of the belt 18 is a layer of dried expanded flocculated microspheres designated by the reference numeral 26*a*. A removal means or doctor knife 38 is disposed adjacent the discharge end of the belt 18 and removes the expanded microspheres as a particulate flocculated mass 39.

The unexpanded microspheres may be supplied as an aqueous dispersion or a wet filter cake. Generally, in order to maintain the amount of dispersing medium at a minimum, it is usually desirable to start with a wet filter cake which beneficially may contain from 60 to 70 weight percent of the microspheres. However, a higher solids content may be employed, but usually there is no advantage to de-watering the microspheres to a solids content greater than 70 to 75 percent.

A wide variety of flocculants may be employed if one desires dry expanded flocculated microspheres. Such flocculants may be any of a wide variety of materials which are hygroscopic and non-hygroscopic. The only requirement of the flocculant is that the flocculant be dispersible in the dispersing medium, such as water, be inert with regard to the polymer shell of the microspheres and nonsolvent therefor, and that on removal of the water the flocculant deposit as a thin film at the drying and expanding temperatures of the microspheres. Satisfactory for flocculation are such diverse agents as synthetic detergents and surface active agents, anionic, ionic, cationic and amphoteric surface active agents and mixtures thereof; natural gums such as lecithin, guar gum, gum agar, emulsified waxes; synthetic gums such as hydroxypropyl methyl cellulose, carboxymethyl cellulose and the like. Such materials as glycol, sodium stearate, lanolin, glyceromonostearate, sodium oleate, nonyl phenol, polyoxyethylene adducts, glycol stearate, sorbitan, monooleate, propylene glycol, ethylene oxide copolymers, linseed oil, castor oil, low molecular weight polybutadiene, low molecular weight polyethylene and the like. Silicone glycol wetting agents are also employed with benefit. Such agents may be employed individually or as mixtures of two or more. Flocculants are generally employed in concentrations of from about 1 to 15 percent, and beneficially from about 2 to 10 percent, and advantageously from about 3 to 9 percent (all percentages are by weight, based on the weight of dry unexpanded microspheres).

Flocculating agents may readily be evaluated by preparing a dispersion of expandable microspheres in an inert medium, such as water, adding the material to be evaluated thereto, with agitation sufficient to disperse the material, and air drying the dispersion. If the dried dispersion shows increased coherence over a dried microsphere dispersion without an additive material, the flocculating material is satisfactory for use in the invention. Flocculating materials should also be evaluated for suitability in the desired end use for the expanded microspheres.

Particularly advantageous and beneficial for drying and foaming microspheres which are to be employed in the fabrication of polyester syntactic foams are a combination of lecithin and silicone glycol wetting agent. A wide variety of surfaces may be employed for drying microspheres such as stainless steel, nickel, heat resistant rubber and the like. A particularly advantageous surface is polytetrafluoroethylene-coated woven glass fiber belt which exhibits exceptionally good release properties regardless of the type of flocculating agent employed and is resistant to temperatures encountered in the drying process.

In the practice of the process of the present invention, the wet microspheres are beneficially spread upon a drying surface such as the surface of the belt 18 either employing a nozzle or a nozzle in combination with a doctoring device such as a wire wound rod or a doctor knife to provide a wet coating having a thickness of up to about 30 mils, beneficially the coating having a thickness of about 20 mils, and for maximum uniformity of foaming and speed of drying, a thickness of about 10 mils; that is, from about 5 to 15 mils. Advantageously, the drying surface is heated by remote heater such as the heater 25 which beneficially is a metal platen such as an aluminum platen over which the belt moves. Generally, it is desirable to heat the platen in a non-uniform manner; for example, in the foaming of microspheres having a polymer shell of a polymer of about 75 weight percent vinylidene chloride and 25 weight percent acrylonitrile. Typically, a temperature of about 170° C. at the feed end is employed, while the temperature adjacent the discharge end is about 120° C. It is desirable to initially raise the temperature of the microspheres as rapidly as possible. This is accomplished by a combination of conduction through the belt, heat from the heater such as the heater 31 with a hot drying gas such as air at an inlet temperature of about 160° C. Thus, the microsphere dispersion is subjected to relatively rapid heating, and drying occurs primarily by vaporization of the medium such as water and the heated water vapor being carried with the microspheres to provide additional heat transfer to effect foaming. Air supplied to the discharge end of the belt, such as by the heater 32, has a temperature of about 120° C. for the hereinbefore mentioned vinylidene chloride acrylonitrile copolymer and the flow is countercurrent which provides an adequate temperature to insure complete foaming and remove minor quantities of entrained water or water vapor remaining from the concurrent stream. On emergence from the oven, relatively rapid cooling below the thermoplastic temperature occurs because of the thin layer of microspheres which is subsequently removed by a suitable doctoring device, such as the device 38, which may be a brush or doctor blade.

When employing the hereinbefore described polyvinylidene chloride dispersion cast on the belt to a thickness of about 10 mils, 1½ minutes are required for drying and foaming. A 20 mil thick cast film requires between 4 and 5 minutes to foam and dry, whereas a 30 mil thick cast film requires between 10 and 12 minutes for drying and foaming.

In a manner similar to the foregoing illustration, other expandable microspheres are readily dried and foamed such as polymethylmethacrylate microspheres, vinyl chloride-vinylidene chloride microspheres, poly-o-chlorostyrene microspheres and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A process for drying and expanding synthetic resinous expandable microspheres, the steps of the method comprising providing a dispersion of a mass of unexpanded synthetic resinous thermoplastic microspheres in a liquid which is a non-solvent for the resin of the microspheres, the dispersion containing from about 0.5 to about 20 weight percent (based on the weight of dry microspheres) of a flocculating agent for the dry expanded microspheres, depositing the resultant dispersion in the form of a thin exposed layer on a moving surface, heating the surface from a location remote from the microspheres and generally adjacent the surface, simultaneously contacting the exposed layer of microsphere dispersion with a stream of gas to thereby remove the moisture therefrom and complete expansion and drying, and subsequently removing the dried microspheres from the surface in the form of a dry particulate mass of flocculated expanded microspheres.

2. The process of claim 1 wherein the liquid is water.

3. The process of claim 2 wherein the microspheres are a copolymer of vinylidene chloride and acrylonitrile.

4. The process of claim 3 wherein the flocculating agent is lecithin.

5. The process of claim 1 wherein the dispersion has a thickness up to about 30 mils.

6. The process of claim 5 wherein the layer thickness is from about 5 to 15 mils.

7. The process of claim 1 wherein the surface is polytetrafluoroethylene-coated.

8. The process of claim 1 wherein the gas streams comprise concurrent and countercurrent streams.

9. The process of claim 8 wherein the concurrent and countercurrent streams are air.

References Cited

UNITED STATES PATENTS

| 240,900 | 5/1881 | Fickett | 34—12 X |
|---|---|---|---|
| 2,431,623 | 11/1947 | Siehrs | 34—12 X |
| 3,340,567 | 9/1967 | Flack et al. | 34—9 X |

JOHN J. CAMBY, Primary Examiner

U.S. Cl. X.R.

252—378 R; 263—21 B